(12) United States Patent
Tachibana et al.

(10) Patent No.: US 9,804,480 B2
(45) Date of Patent: Oct. 31, 2017

(54) IMAGING APPARATUS STAND

(71) Applicant: CASIO COMPUTER CO., LTD., Shibuya-ku, Tokyo (JP)

(72) Inventors: Seiji Tachibana, Hamura (JP); Toshiaki Kanamura, Ome (JP); Hirokazu Hasegawa, Koganei (JP); Marie Hashimoto, Kodaira (JP); Akihiro Miyahara, Kawasaki (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/366,757

(22) Filed: Dec. 1, 2016

(65) Prior Publication Data

US 2017/0277019 A1    Sep. 28, 2017

(30) Foreign Application Priority Data

Mar. 23, 2016   (JP) .................. 2016-058508

(51) Int. Cl.

| | |
|---|---|
| *G03B 17/56* | (2006.01) |
| *F16M 11/18* | (2006.01) |
| *A47B 23/06* | (2006.01) |
| *F16M 11/04* | (2006.01) |
| *F16M 11/20* | (2006.01) |
| *A47B 23/04* | (2006.01) |

(Continued)

(52) U.S. Cl.
CPC .......... *G03B 17/561* (2013.01); *A47B 23/04* (2013.01); *A47B 23/042* (2013.01); *A47B 23/06* (2013.01); *F16M 11/041* (2013.01); *F16M 11/046* (2013.01); *F16M 11/18* (2013.01); *F16M 11/2014* (2013.01); *G03B 15/02* (2013.01); *G03B 29/00* (2013.01)

(58) Field of Classification Search
None
See application file for complete search history.

(56) References Cited

U.S. PATENT DOCUMENTS

| | | | | |
|---|---|---|---|---|
| 8,559,063 | B1* | 10/2013 | Booppanon | G03B 15/07 358/302 |
| 2006/0110152 | A1* | 5/2006 | Sukenari | G03B 15/03 396/155 |

(Continued)

FOREIGN PATENT DOCUMENTS

| | | |
|---|---|---|
| JP | 2007219197 A | 8/2007 |
| JP | 2011107611 A | 6/2011 |

*Primary Examiner* — W B Perkey
(74) *Attorney, Agent, or Firm* — Holtz, Holtz & Volek PC

(57) ABSTRACT

An imaging apparatus stand includes a first member having an L shape, a second member similarly having an L shape, an adjustment section which raises and lowers the first member, and a third member rotatably coupled to a portion of the second member provided extending at right angle to the second member. The first member includes a stage provided extending at right angle thereto. On the stage, a tablet terminal is placed such that its camera section is directed downward. The adjustment section raises and lowers the first member, i.e., the stage by an operation knob being operated. The third member functions as a leg portion for making the imaging apparatus stand self-supporting. On the lower surface of the stage of the first member, a lighting device using an LED as a light emitting element is provided.

8 Claims, 8 Drawing Sheets

(51) Int. Cl.
*G03B 29/00* (2006.01)
*G03B 15/02* (2006.01)

(56) References Cited

U.S. PATENT DOCUMENTS

| | | | |
|---|---|---|---|
| 2006/0152639 A1* | 7/2006 | Yoon | G03B 15/035 349/6 |
| 2007/0160364 A1* | 7/2007 | Peika | F16M 11/14 396/428 |
| 2010/0321561 A1* | 12/2010 | Duncan | F16M 11/041 348/373 |
| 2011/0122327 A1 | 5/2011 | Kotani | |
| 2013/0176483 A1* | 7/2013 | Shen | G03B 17/54 348/373 |
| 2014/0153066 A1* | 6/2014 | Booppanon | G03B 15/07 358/483 |
| 2015/0117489 A1* | 4/2015 | McGurk | B29C 49/786 374/121 |
| 2016/0178112 A1* | 6/2016 | Shi | F16M 11/046 348/150 |
| 2016/0219192 A1* | 7/2016 | Rosenberry | H04N 5/2251 |

* cited by examiner

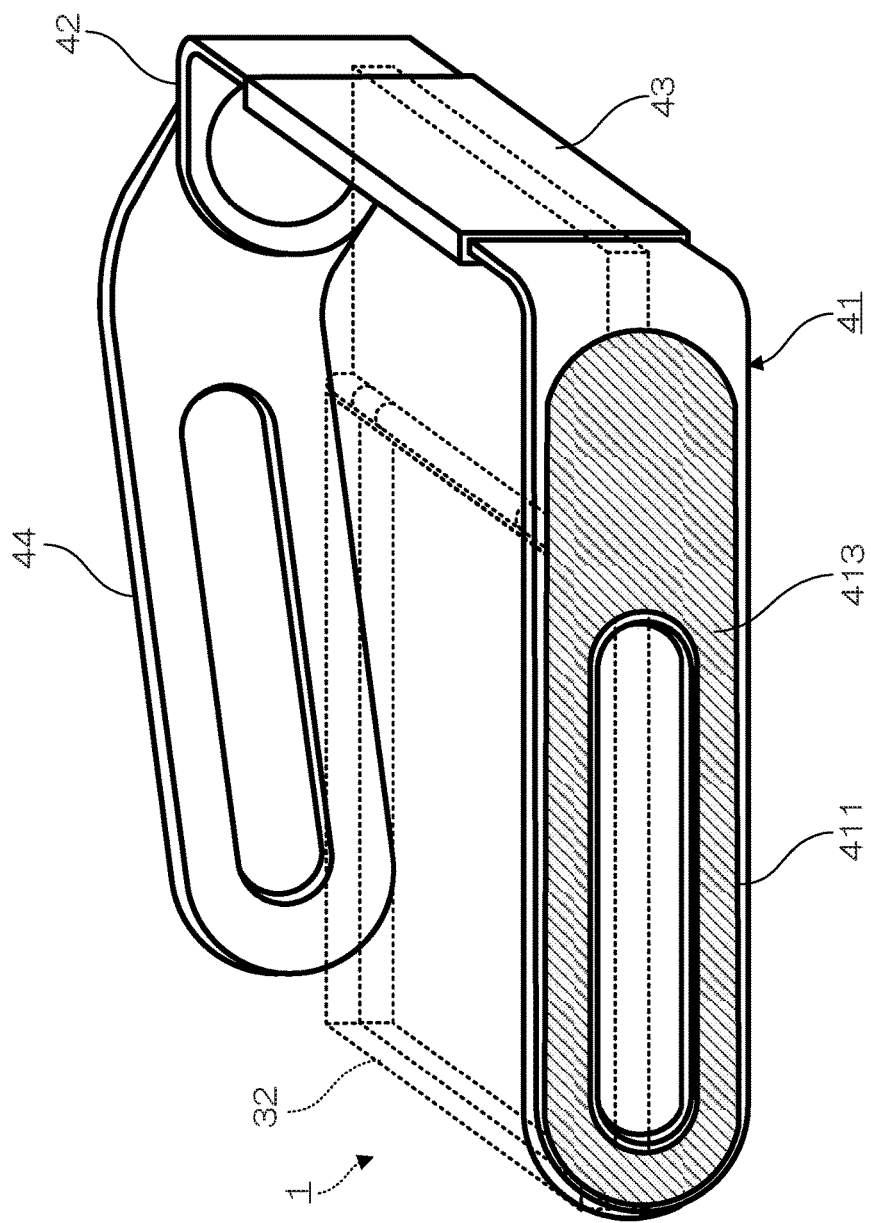

IMAGING APPARATUS STAND

CROSS-REFERENCE TO RELATED APPLICATION

This application is based upon and claims the benefit of priority from the prior Japanese Patent Application No. 2016-058508, filed Mar. 23, 2016, the entire contents of which are incorporated herein by reference.

BACKGROUND OF THE INVENTION

1. Field of the Invention

The present invention relates to an imaging apparatus stand.

2. Description of the Related Art

Conventionally, when a photographic subject is to be captured using the imaging function of an information terminal such as a smartphone and a tablet terminal or a digital camera, this information terminal is fixed by certain means for long-term photographing, camera-shake prevention, or the like. Note that, in the descriptions below, electronic apparatuses having an imaging function, such as information terminals including smartphones and tablet terminals or digital cameras, are referred to as imaging apparatuses.

For example, Japanese Patent Application Laid-Open (Kokai) Publication No. 2011-107611 discloses a technique using a stand where an imaging apparatus is fixed on one end of its arm having a plurality of joints such that it is rotatable in triaxial directions, the other end is fixed on an installation surface, and a portion of the arm can be attached with a plurality of electronic devices.

Also, Japanese Patent Application Laid-Open (Kokai) Publication No. 2007-219197 discloses a technique using a tripod stand which is provided with support poles that are vertically movable on its end portion and a support bar that is horizontally movable with respect to the support poles and in which an imaging apparatus is fixed to a distal end of the support bar in a manner to be rotatable in biaxial directions.

SUMMARY OF THE INVENTION

In accordance with one aspect of the present invention, there is provided an imaging apparatus stand comprising: a first member which includes a stage where an imaging apparatus is placed such that an imaging direction of the imaging apparatus is oriented toward pages of an opened book; a second member which supports the first member; a third member which rotatably supports the first member via the second member; and an adjustment section which is interposed between the first member and the second member and enables the first member to be vertically movable.

In accordance with another aspect of the present invention, there is provided an imaging apparatus stand comprising: a stage section on which an imaging apparatus is placed such that an imaging direction of the imaging apparatus is oriented toward a holding table where an opened book is placed; and a pedestal section which is connected to the stage section via a supporting member which supports the stage section and extends in a predetermined direction from the supporting member, wherein the pedestal section is formed to be removably inserted into the holding table.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention can be more deeply understood by the detailed description below being considered together with the following drawings.

FIG. 8 is a perspective view showing a method for accommodating the imaging apparatus stand 40 according to the present embodiment.

DETAILED DESCRIPTION OF THE PREFERRED EMBODIMENTS

An embodiment of the present invention will hereinafter be described with reference to the drawings.

Figure 1:
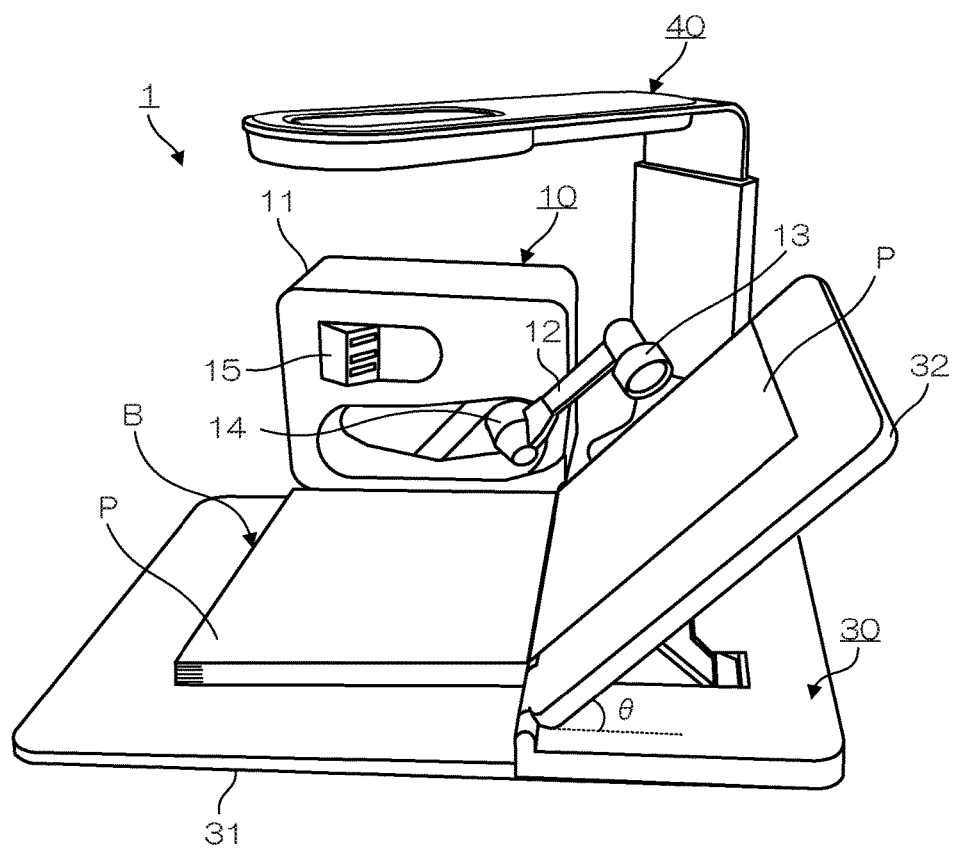
FIG. 1 is a perspective view showing the outer structure of a page turning apparatus 1 using an imaging apparatus stand according to an embodiment of the present invention.

FIG. 1 is a perspective view showing the outer appearance of a page turning apparatus 1 using an imaging apparatus stand 40 according to the embodiment of the present invention. Note that in the following descriptions a case is exemplarily described in which pages P of a book B are turned from left to right. As shown in FIG. 1, the page turning apparatus 1 includes a page turning apparatus body 10 which turns pages P of the book B, and a holding table 30 which holds the opened book B.

The page turning apparatus body 10 includes an accommodation case 11 having a substantially rectangular parallelepiped shape, an arm section 12 which can be accommodated in the accommodation case 11, a sticking section (adhesive roller section) 13 which is attached to a distal end of the arm section 12 and sticks to a page P of the book B, a driving section 14 such as a motor which swings the arm section 12 back and forth from right to left or from left to right, and an air blowing section 15 which blows air against a page P at a page-turning end point by making air pass above a page P at a page-turning start point so as to separate the page P from the sticking section 13.

The holding table 30 includes a pair of holding plates 31 and 32 which is foldable by a hinge. In the case where pages P of the book B are turned from left to right, one holding plate 31 of the pair of holding plates 31 and 32 on the left side is placed along the top of the table, and the other holding plate 32 on the right side is placed obliquely upward on the top of the table at a predetermined tilt angle with respect to the holding plate 31 on the left side. On the holding plate 31 on the left side, pages P that serve as a page-turning start point of the book B are placed. On the other holding plate 32, pages P that serve as a page-turning end point of the book B are placed.

Accordingly, the holding table 30 holds the book B such that the pages P at the page-turning end point tilt upward with the seam of the book B as an axis, as compared to the pages P at the page-turning start point. Note that, since the pair of holding plates 31 and 32 is foldable by the hinge, an angle between the pair of holding plates 31 and 32 can be adjusted, and a tilt angle θ of the pages P at the page-turning end point with respect to a horizontal plane can be freely adjusted. Note that this tilt angle θ should preferably be adjusted in a range of 30 to 45 degrees.

The imaging apparatus stand 40 includes a stage 411 extending diagonally to an imaging target page P at a page-turning start point of the opened book B and parallel to the installation surface of the imaging apparatus stand 40. In the descriptions below, as an imaging apparatus to be set on the stage 411, a tablet terminal is described. However, the imaging apparatus is not limited thereto. Also, in the descriptions below, the imaging apparatus stand 40 according to the present invention is described in detail, and descriptions for the page turning apparatus 1 are omitted.

Figure 2:
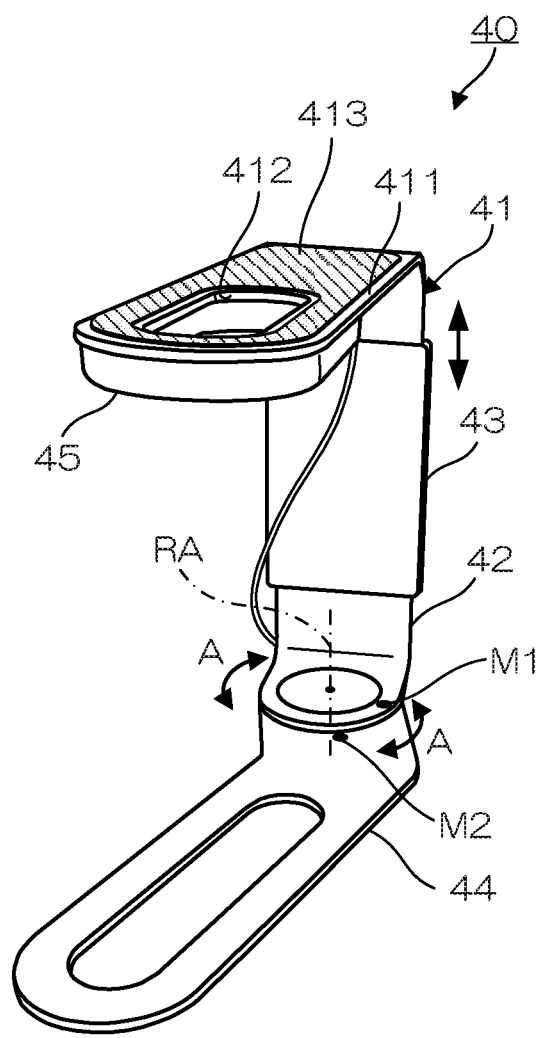
FIG. 2 is a perspective view showing the outer structure (front surface) of the imaging apparatus stand according to the present embodiment.

FIG. 2 is a perspective view showing the outer structure (front surface) of the imaging apparatus stand 40 according to the present embodiment. In FIG. 2, a state (a self-supporting state) when the imaging apparatus stand 40 is being used is shown. The imaging apparatus stand 40 includes a first member 41 having an L shape, a second member 42 also having an L shape, an adjustment section 43 which moves the first member 41 up and down with the second member 42 as a base, and a third member 44 (a pedestal section forming the installation surface of the imaging apparatus stand 40) rotatably coupled to a portion of the second member 42 extending at right angle to its body.

The first member 41 includes the stage 411 provided to extend at right angle thereto. In the vicinity of a distal end of the stage 411, an oval opening section 412 is formed along the longitudinal direction. On the stage 411, a sheet 413 made of a material such as EPP (Expanded Polypropylene) or the like used for both anti-slipping and shock absorption is provided avoiding the opening section 412. On this stage 411, the camera section (lens opening section) of a tablet terminal (not shown) or the like is placed with it being directed downward (details thereof will be described below). In order to place the tablet terminal, the first member 41 is required to have a planar shape (plate shape), and its perpendicularly extending portion is inserted into the adjustment section 43.

As with the first member 41, a perpendicularly extending portion of the second member 42 is inserted into the adjustment section 43. On the other hand, a lower portion of the second member 42 extending at a right angle is coupled to one end of the third member 44 in a manner to be rotatable around rotation axis RA.

The adjustment section 43 includes an operation knob 50 described below, and the first member 41, i.e., the stage 411 is vertically moved (up and down) by an operation of this operation knob 50.

The third member 44 functions as a leg portion for the self-support of the imaging apparatus stand 40.

As described above, the portion of the second member 42 provided extending at a right angle and an end of the third member 44 are coupled to each other such that they are rotatable around rotation axis RA. That is, the second member 42 (including the adjustment section 43 and the first member 41) can be rotated in a direction indicated by arrows A with respect to the third member 44. The second member 42 being rotatable indicates that the first member 41 and the stage 411 are rotatable around rotation axis RA and the position of the stage 411 (a position relative to the book B) is variable.

A position achieved by the second member 42 (including the adjustment section 43 and the first member 41) being rotated such that mark M1 attached to the second member 42 and mark M2 attached to the third member 44 correspond to each other is a reference position. That is, when the second member 42 is set at the position where the marks M1 and M2 correspond to each other, the stage 411 of the diagonally extending first member 41 opposes a page P of the book B set in the page turning apparatus 1 (details thereof will be described below). Then, at this reference position, the camera section of the tablet terminal placed on the stage 411 photographs (captures) the page P of the book B set in the page turning apparatus 1.

On the lower surface of the stage 411 of the first member 41, a lighting device 45 using a light emitting diode (LED) as a light emitting element is provided.

Figure 3:
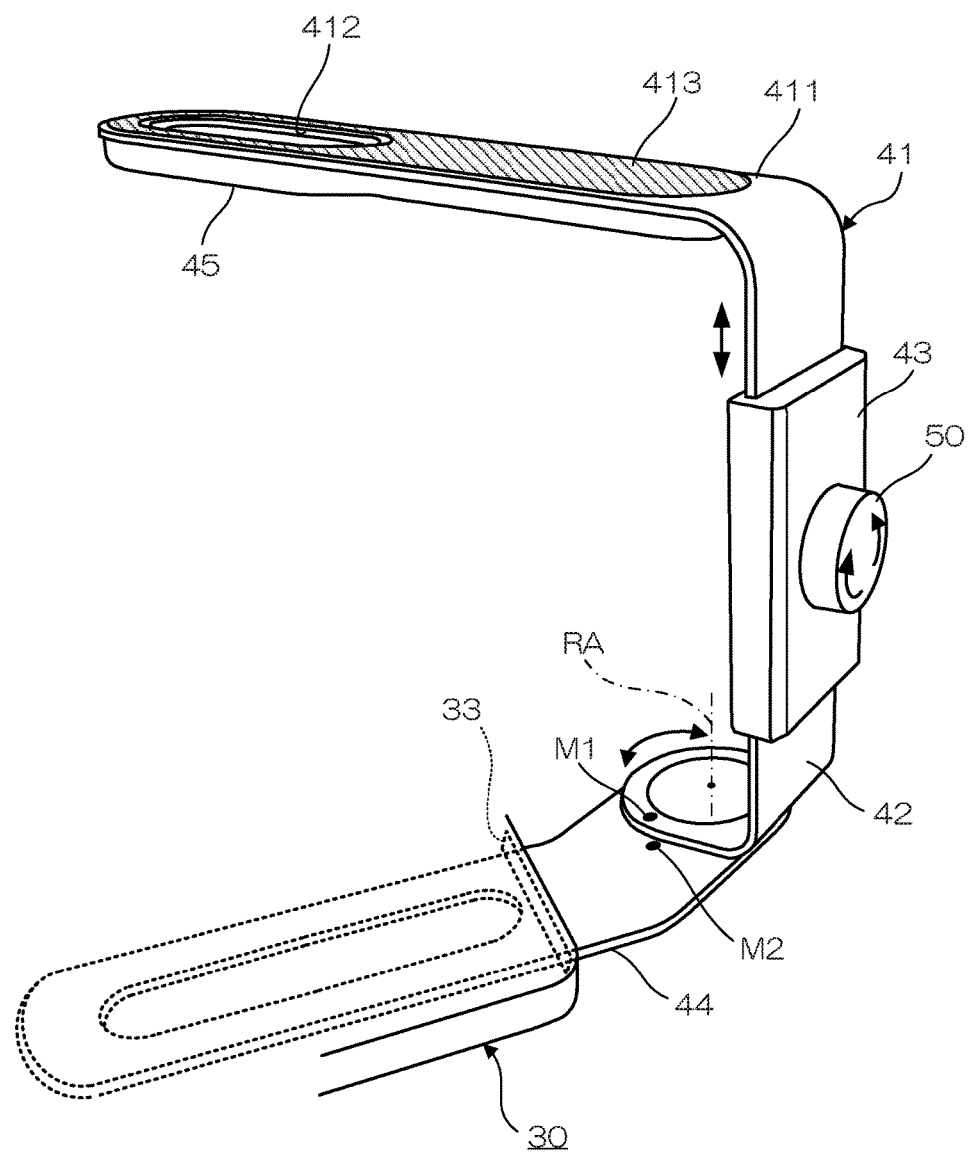
FIG. 3 is a perspective view showing the outer structure (rear surface) of the imaging apparatus stand according to the present embodiment.

FIG. 3 is a perspective view showing the outer structure (rear surface) of the imaging apparatus stand 40 according to the present embodiment. In FIG. 3, a state (a self-supporting state) when the imaging apparatus stand 40 is being used is shown. As described above, the adjustment section 43 includes the operation knob 50 which moves the first member 41 up and down. When the operation knob 50 is rotated in the clockwise direction, the first member 41 is moved upward. That is, the stage 411 is moved upward. On the other hand, when the operation knob 50 is rotated in the counterclockwise direction, the first member 41 is moved downward. That is, the stage 411 is moved downward.

The viewing angle of an imaging apparatus, such as a tablet terminal, placed on the stage 411 changes in accordance with up-and-down movements of the stage 411. In a case where a page of a relatively small book (such as a pocket book; 105 mm×148 mm or the like) is photographed, the viewing angle is made smaller by the stage 411 being lowered to shorten the distance between the camera section and the book. In a case where a page of a relatively large book (such as that of the A4 size; 210 mm×297 mm) is photographed, the viewing angle is made larger by the stage 411 being raised to widen the distance between the camera section and the book.

The third member 44 is inserted into an opening section 33 provided in the holding table 30 of the page turning apparatus 1. As a result, a position of the imaging apparatus stand 40 relative to the page turning apparatus 1 is physically determined. That is, a position of the tablet terminal relative to a page P at a page-turning start point of the book B is determined.

Figure 4:
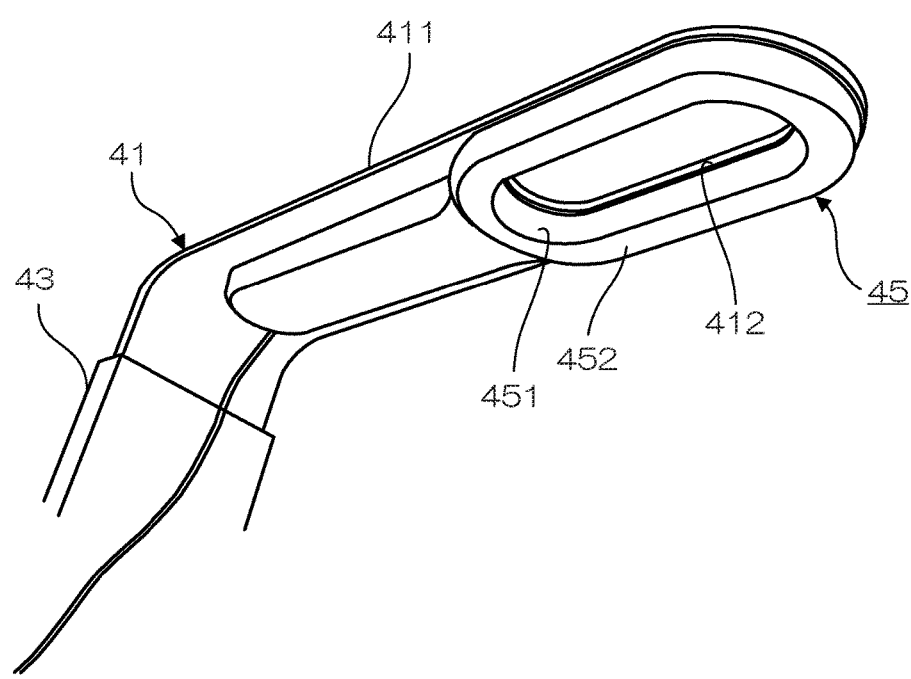
FIG. 4 is a perspective view showing the outer structure (lighting section) of the imaging apparatus stand according to the present embodiment.

FIG. 4 is a perspective view showing the outer structure (lighting section) of the imaging apparatus stand 40 according to the present embodiment. On the lower surface of the stage 411 of the first member 41, the above-described lighting device 45 is provided. This lighting device 45 includes a lamp shade 452 where an opening section 451 is provided on the center side of its oval shape such that the lighting device 45 is arranged to surround the opening section 412 provided in the stage 411. The lamp shade 452 diffuses light from an LED (not shown) serving as the light emitting device so that the illuminance of the irradiated light on a page P of the book B is substantially equalized. In addition, the lamp shade 452 functions to protect the LED.

Figure 5:
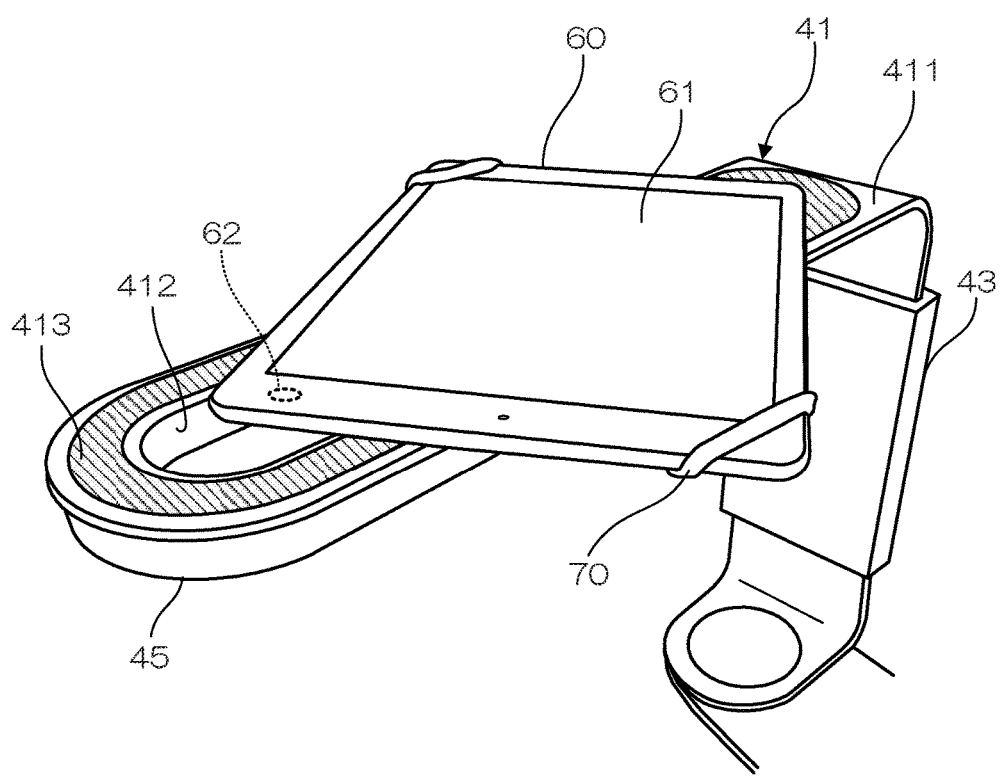
FIG. 5 is a perspective view showing a state where a tablet terminal has been set on the imaging apparatus stand according to the present embodiment.

FIG. 5 is a perspective view showing a state where a tablet terminal 60 has been set on the imaging apparatus stand 40 according to the present embodiment. In an example shown in FIG. 5, a camera section (lens opening section) 62 provided on the rear surface of the tablet terminal 60 (on the side opposite to a display panel 61) photographs pages P of the book B. Therefore, the tablet terminal 60 is placed on the stage 411 with its rear surface being directed downward and the display panel 61 being directed upward so that pages P of the book B comes within the viewing angle of the camera section 62 of the tablet terminal 60.

Here, the tablet terminal 60 is positioned such that the camera section (lens opening section) 62 is positioned to be directed toward pages P of the book B via the opening section 412 provided in the stage 411 and to be positioned substantially above the center of the book B to be photographed. In the positioning, if a photographing mode by a predetermined application is being executed, a live image currently being captured by the camera section 62 is displayed on the display panel 61. Therefore, the user determines the position of the tablet terminal 60 such that pages P come within the viewing angle while viewing the display. When the position of the tablet terminal 60 is determined, the tablet terminal 60 is fixed to the stage 411 by diagonally opposite corners of the tablet terminal 60 being held with a stretchable band 70 made of silicon. Note that, in order to fix the diagonally opposite corners of the tablet terminal 60 with the stretchable band 70, at least these corners are required to protrude from the area of the stage 411. In an area between the tablet terminal 60 and the stage 411, a sheet 413 provided on the stage 411 is interposed. Therefore, the tablet terminal 60 is not damaged. A method for fixing it with the stretchable band 70 will be described below.

Figure 6A:
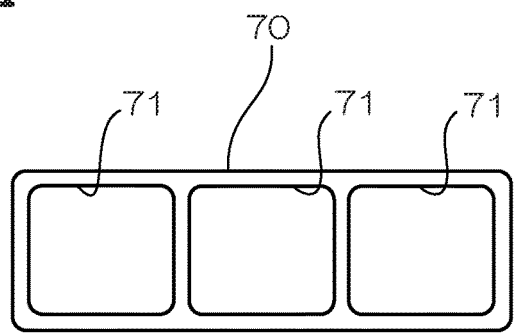
FIG. 6A and FIG. 6B are a top view showing the outer appearance of a stretchable band for fixing the tablet terminal on the imaging apparatus stand according to the present embodiment and a partial perspective view showing a state where the tablet terminal has been fixed on the imaging apparatus stand with the stretchable band.
Figure 6B:
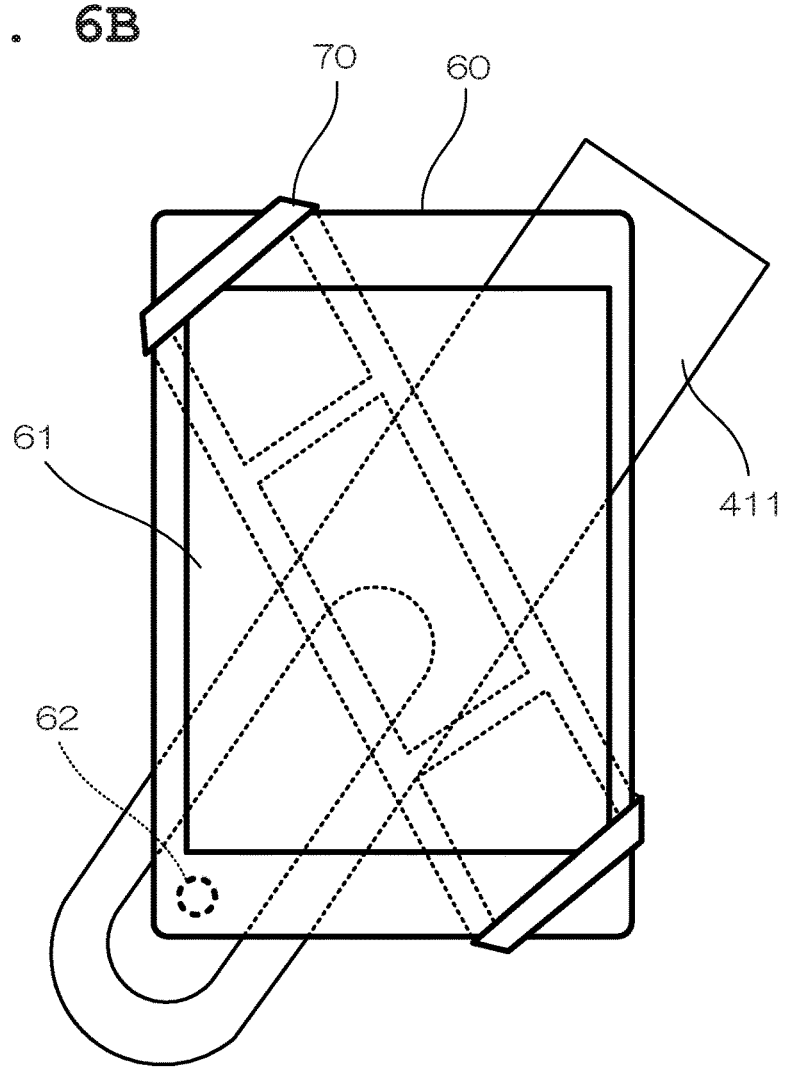

FIG. 6A is a top view showing the outer appearance of the stretchable band 70 for fixing the tablet terminal 60 on the imaging apparatus stand 40 according to the present embodiment, and FIG. 6B is a partial perspective view showing a state where the tablet terminal 60 has been fixed on the imaging apparatus stand 40 with the stretchable band 70. This stretchable band 70 is made of a material such as silicon which is stretchable and does not damage the tablet terminal 60, and has a shape of a ladder having a plurality of opening sections 71, as shown in FIG. 6A and FIG. 6B.

In order to fix the tablet terminal 60, an opening section 71 at one end of the stretchable band 70 is hung on one of the diagonally opposite corners of the tablet terminal 60 on the stage 411, and an opening section 71 at the other end is hung on the other one of the diagonally opposite corners of the tablet terminal 60 through an area under the stage 411. Here, the tablet terminal 60 is not completely fixed on the imaging apparatus stand 40. However, since the stretchable band 70 and the sheet 413 are made of materials on which the tablet terminal 60 does not easily slide, the tablet terminal 60 is sufficiently fixed to the extent that it is not unintentionally moved during photographing or does not cause camera-shake in photographing.

In order to reliably hang the stretchable band 70 on the tablet terminal 60 such that slack does not occur, the above-described opening section 71 to be hung on a corner of the tablet terminal 60 may be switched based on the flexibility of the stretchable band 70 and the size of the tablet terminal 60. That is, if the size of the tablet terminal 60 is small, an opening section 71 at one end and an opening section 71 at the center may be hung on the tablet terminal 60. If the size of the tablet terminal 60 is large, opening sections 71 at both ends may be hung on the tablet terminal 60.

As such, the stretchable band 70 is hung on through the rear surface of the tablet terminal 60. Accordingly, the display panel 61 is not covered by the stretchable band 70 and therefore its visibility is not decreased. By the stretchable band 70 being made using a material such as silicon, sufficient flexibility and durability can be acquired, whereby the tablet terminal 60 can be fixed without being damaged.

Note that the number of opening sections 71 and the size thereof may be arbitrarily determined based on the strength and the length of the stretchable band 70, and are not limited to those in the shown example.

Figure 7:
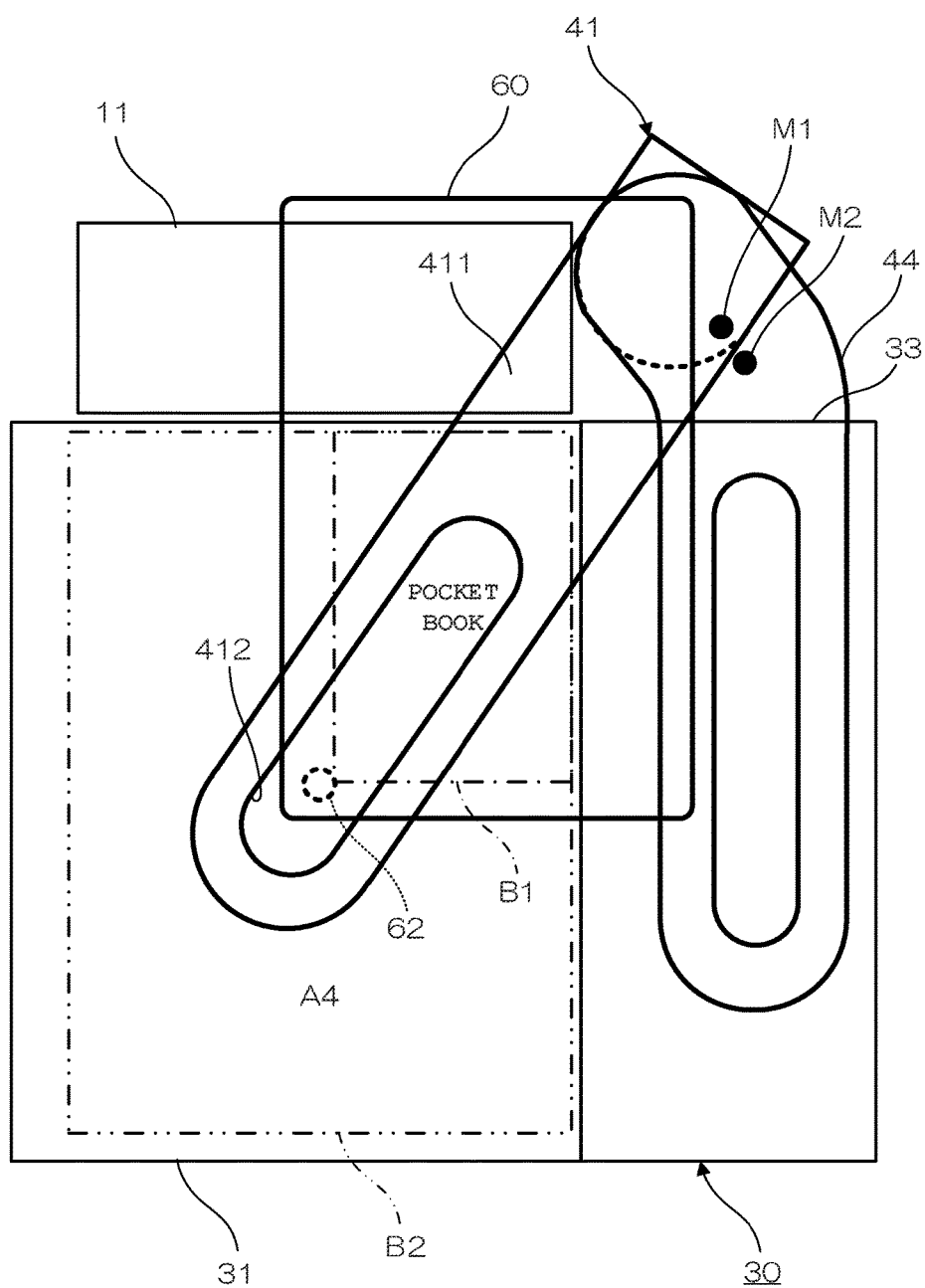
FIG. 7 is a top view showing a relationship between a fixing position of the tablet terminal and the size of a book in the imaging apparatus stand according to the present embodiment.

FIG. 7 is a top view showing a relationship between a fixing position of the tablet terminal 60 and the size of the book B in the imaging apparatus stand 40 according to the present embodiment. In FIG. 7, a relationship among the page turning apparatus 1, the imaging apparatus stand 40, and the size of the book B is shown. As described above, the third member 44 of the imaging apparatus stand 40 is inserted into the opening section 33 provided in the holding table 30 of the page turning apparatus 1. This opening section 33 is provided in a side surface of a pedestal of the holding table 30 (on the lower right side of the holding table 30 shown in FIG. 1) for supporting the holding plate 32 at a page-turning end point and holding it at a predetermined angle, which is located on the side where the page turning apparatus body 10 is arranged (the right rear side of FIG. 1). Also, in a bottom portion of the pedestal of the holding table 30 (on the lower right side of the holding table 30 shown in FIG. 1), a recess of the holding table 30 into which the third member 44 is inserted via the opening section 33 is provided extending from the opening section 33 toward the front side of FIG. 7. As such, the third member 44 is detachably fixed to the opening section 33 in the holding table 30 of the page turning apparatus 1, whereby the position of the imaging apparatus stand 40 relative to the page turning apparatus 1 is physically fixed.

Also, one end of the third member 44 is bent. Therefore, by the housing of the accommodation case 11 coming in contact with an end surface of the bent third member 44 when the accommodation case 11 is set at a predetermined position, the position of the accommodation case 11 is determined with consistency. That is, the movement of the accommodation case 11 toward a page-turning end point of a page P of the opened book B is restricted. In addition, relative positions of the page turning apparatus body 10 during a page-turning operation, the holding table 30 for holding the opened book B, and the opened book B are physically determined, so that the page turning apparatus 1 can be easily set.

When the second member 42 (including the adjustment section 43 and the first member 41) is rotated to the position where marks M1 and M2 respectively attached to the second member 42 and the third member 44 of the imaging apparatus stand 40 correspond to each other, the stage 411 of the first member 41 is positioned substantially diagonally to the holding plate 31. That is, the opening section 412 provided in the stage 411 is positioned substantially diagonally to the book B placed on the holding plate 31. Accordingly, by the tablet terminal 60 placed on the stage 411 being moved as needed, a book B1 of a relatively small size such as a pocket book (105 mm×148 mm) or a book B2 of a relatively large size such as A4 size (210 mm×297 mm) can be within the viewing angle of the camera section 62 of the tablet terminal 60.

Note that, by the rotation angle of the first member 41 being adjusted as needed regardless of marks M1 and M2, even a book B of another size or a book B with an aspect ratio different from that in the drawing can be within the viewing angle of the camera section 62 of the tablet terminal 60.

FIG. 8 is a perspective view showing a method for accommodating the imaging apparatus stand 40 according to the present embodiment. When the imaging apparatus stand 40 is to be accommodated, the third member 44 is rotated around rotation axis RA (see FIG. 3) such that its end portion corresponds to an end portion of the first member 41 on the same plane and the imaging apparatus stand 40 has a U shape as a whole, as shown in FIG. 8. Also, when the page turning apparatus 1 is to be accommodated, the holding plate 32 is folded by the hinge and closed, and both sides of the page turning apparatus 1 are placed between the first member 41 and the third member 44 of the imaging apparatus stand 40. As a result, the imaging apparatus stand 40 and the page turning apparatus 1 can be compactly accommodated in an accommodation bag or the like.

Note that although the example where the camera section (lens opening section) 62 is located at the corner on the rear surface of the tablet terminal 60 has been described in the above-described embodiment the present invention is not limited thereto. That is, even in a case where the camera section (the lens opening section) 62 is located at the upper center on the rear surface of the tablet terminal 60, photographing can be similarly performed merely by an angle at which the tablet terminal 60 is placed on the stage 411 being changed.

According to the above-described embodiment, the imaging apparatus stand 40 is constituted by the first member 41 having the stage 411 which is provided extending substantially horizontally to pages P of the opened book B and on which the tablet terminal 60 is placed, the second member 42 which supports the first member 41, the third member 44 which rotatably supports the first member 41 via the second member 42, and the adjustment section 43 which is interposed between the first member 41 and the second member 42 and enables the first member 41 to be vertically movable. Therefore, the tablet terminal 60 serving as an imaging apparatus can be easily set at a predetermined position.

Also, according to the present embodiment, the third member 44 is detachably fixed to the opening section 33 in the holding table 30 of the page turning apparatus 1. Therefore, the imaging apparatus stand 40 can be easily set, and the tablet terminal 60 serving as an imaging apparatus can be easily set at a predetermined position.

Moreover, according to the present embodiment, the movement of the accommodation case 11 of the page turning apparatus 1 toward the page-turning end point of a page P of the book B is restricted by the shape of the third member 44 fixed to the holding table 30. Therefore, by the imaging apparatus stand 40 being set, the accommodation case 11 can be easily positioned.

Furthermore, according to the present embodiment, the stage 411 is provided extending substantially diagonally to pages P of the opened book B. Therefore, the tablet terminal 60 can be easily set at a predetermined position in accordance with the size of the book B.

Still further, according to the present embodiment, the tablet terminal 60 is placed on the upper surface of the stage 411 such that the imaging direction of the tablet terminal 60 is oriented toward pages P of the book B via the opening section 412 formed along the longitudinal direction of the stage 411. Therefore, the tablet terminal 60 can be easily set at a predetermined position where pages P of the book B can be photographed.

Yet still further, according to the present embodiment, the sheet 413 for preventing the tablet terminal 60 from coming in direct contact with the upper surface of the stage 411 is provided. Therefore, the tablet terminal 60 can be easily set at a predetermined position without being damaged.

Yet still further, according to the present embodiment, the sheet 413 is formed of a material having at least an anti-slipping property or a shock absorption property. Therefore, the tablet terminal 60 can be easily and reliably set at a predetermined position without being damaged and without easily shifting and moving.

Yet still further, according to the present embodiment, the lighting device 45 is provided on the lower surface of the stage 411. Therefore, pages P of the book B can be photographed without lighting for photographing being separately prepared.

Yet still further, according to the present embodiment, the imaging apparatus stand 40 is accommodated by the third member 44 being rotated around the rotation axis RA such that its end portion corresponds to an end portion of the first member 41 on the same plane and the imaging apparatus stand 40 has a U shape as a whole, and the page turning apparatus 1 whose folding plate 32 has been folded by the hinge is accommodated such that its sides are located between the first member 41 and the third member 44 of the imaging apparatus stand 40. Therefore, the page turning apparatus 1 and the imaging apparatus stand 40 can be compactly accommodated in one accommodation bag or the like.

While the present invention has been described with reference to the preferred embodiments, it is intended that the invention be not limited by any of the details of the description therein but includes all the embodiments which fall within the scope of the appended claims.

What is claimed is:

1. An imaging apparatus stand comprising:
   a first member which includes a stage configured to have an imaging apparatus placed thereon such that an imaging direction of the imaging apparatus is oriented toward pages of an opened book;
   a second member which supports the first member;
   a third member which rotatably supports the first member via the second member; and
   an adjustment section which is interposed between the first member and the second member and enables the first member to be vertically movable,
   wherein the third member is detachably fixable to a holding table which holds the opened book, and
   wherein the third member is configured to restrict a movement of a page turning apparatus for turning the pages of the opened book toward a page-turning end point, by a shape when the third member is fixed to the holding table.

2. The imaging apparatus stand according to claim 1, wherein the second member supports the first member in a vertical direction,
   wherein the third member enables the first member to be rotatable by supporting the second member such that the second member is rotatable in a horizontal direction, and
   wherein the first member, the second member, and the third member are configured to form a U shape when the second member is rotated with respect to the third member, to have an accommodable form in which the U shape is configured to surround side surfaces of the holding table.

3. The imaging apparatus stand according to claim 1, wherein the stage is configured to extend substantially diagonally to the pages of the opened book.

4. The imaging apparatus stand according to claim 1, wherein the stage has an oval opening section formed along a longitudinal direction, and wherein the stage is configured to have the imaging apparatus placed on an upper surface thereof such that the imaging direction of the imaging apparatus is oriented toward the pages of the opened book via the opening section formed in the stage.

5. The imaging apparatus stand according to claim 1, wherein the stage includes a sheet that prevents the imaging apparatus from coming in direct contact with an upper surface of the stage.

6. The imaging apparatus stand according to claim 5, wherein the sheet is made of a material having at least an anti-slipping property or a shock absorption property.

7. The imaging apparatus stand according to claim 1, further comprising:

a lighting device provided on a lower surface of the stage.

8. An imaging apparatus stand comprising:

a stage section configured to have an imaging apparatus placed thereon such that an imaging direction of the imaging apparatus is oriented toward a holding table where an opened book is placed; and a pedestal section which is connected to the stage section via a supporting member which supports the stage section and extends in a predetermined direction from the pedestal section, wherein the pedestal section is formed to be removably insertable into the holding table, and wherein the pedestal section is configured to restrict a movement of a page turning apparatus for turning pages of the opened book toward a page-turning end point, by a shape when the pedestal section is inserted into the holding table.

\* \* \* \* \*